US012710311B2

(12) United States Patent
Xie

(10) Patent No.: US 12,710,311 B2
(45) Date of Patent: Aug. 18, 2026

(54) AIMING EQUIPMENT AND SPECTROSCOPE MODULE THEREOF

(71) Applicant: TAIZHOU GUANYU TECHNOLOGY CO., LTD., Zhejiang Province (CN)

(72) Inventor: Xiwei Xie, Jiangxi Province (CN)

(73) Assignee: TAIZHOU GUANYU TECHNOLOGY CO., LTD., Zhejiang Province (CN)

( * ) Notice: Subject to any disclaimer, the term of this patent is extended or adjusted under 35 U.S.C. 154(b) by 90 days.

(21) Appl. No.: 18/767,994

(22) Filed: Jul. 10, 2024

(65) Prior Publication Data

US 2025/0076114 A1 Mar. 6, 2025

(30) Foreign Application Priority Data

Sep. 4, 2023 (CN) ......................... 202311127858.X

(51) Int. Cl.
*G01J 3/02* (2006.01)

(52) U.S. Cl.
CPC ........... *G01J 3/0289* (2013.01); *G01J 3/0208* (2013.01)

(58) Field of Classification Search
CPC .......... F41G 1/30; G01J 3/0208; G01J 3/0289
See application file for complete search history.

(56) References Cited

U.S. PATENT DOCUMENTS 10,240,898 B2 3/2019 Crispin
2010/0095578 A1 4/2010 Elpedes et al.
2011/0102785 A1 5/2011 Tsai

FOREIGN PATENT DOCUMENTS

CN 108132534 B * 9/2020 ......... G02B 27/0172

OTHER PUBLICATIONS

Extended European search report, Cited References and Search Report dated Dec. 17, 2024 issued by the European Patent Office for the EP Counterpart Application No. 24188015.2.

* cited by examiner

*Primary Examiner* — Hina F Ayub
(74) *Attorney, Agent, or Firm* — WPAT LAW; Anthony King

(57) ABSTRACT

The present disclosure relates to an aiming equipment and a spectroscope module thereof. The aiming equipment includes a light source module and a spectroscope module. The light source module is configured to project first light and second light. The first light and the second light have different wavelengths. The spectroscope module includes at least two lenses to reflect the first light and the second light and reduce a color difference between the first light and the second light.

12 Claims, 3 Drawing Sheets

AIMING EQUIPMENT AND SPECTROSCOPE MODULE THEREOF

FIELD OF THE PRESENT DISCLOSURE

The present disclosure relates to an aiming equipment and a spectroscope module thereof, and more particularly to an aiming equipment having a light source of different wavelengths and a spectroscope module thereof.

DESCRIPTION OF THE PRIOR ART

A lens module of a current conventional aiming equipment is designed for a light source of a single wavelength. However, when a light emitting element of an aiming equipment needs to emit different lights, a color difference is generated when the different lights having different wavelengths pass through the lens module, further causing parallax perceivable to a user viewing from different positions and hence a reduced accuracy. Therefore, there is a need for an aiming equipment and a spectroscope module to improve such possible parallax in the event of multiple light sources.

SUMMARY OF THE PRESENT DISCLOSURE

In view of the above, it is an object of the present disclosure to provide an aiming equipment and a spectroscope module to overcome the issues above.

An aiming equipment disclosed according to an embodiment of the present disclosure includes a light source module and a spectroscope module. The light source module projects a first light and a second light. The first light and the second light have different wavelengths. The spectroscope module includes at least two lenses operable to reflect the first light and the second light and reduce a color difference between the first light and the second light.

A spectroscope module for an aiming equipment disclosed according to an embodiment of the present disclosure includes a first lens, a second lens and a third lens. The second lens is disposed between the first lens and the third lens. The third lens faces a light source module of the aiming equipment. The second lens has a reflecting film on one surface adjacent to the first lens. The reflecting film is operable to reflect a first light and a second light projected by the light source module.

A spectroscope module for an aiming equipment disclosed according to an embodiment of the present disclosure includes a first lens and a second lens. The second lens faces a light source module of the aiming equipment. The second lens has a first reflecting film and a second reflecting film on a first surface and a second surface, respectively. The first reflecting film is operable to reflect a first light projected by the light source module. The second reflecting film is operable to reflect a second light projected by the light source module.

BRIEF DESCRIPTION OF THE DRAWINGS

Multiple implementation forms of the present disclosure can be optimally understood after going through the embodiments and the accompanying drawings below. It should be noted that, according to standard operating practices in the field, the various features in the drawings are not drawn to scale. In fact, for clear illustrations, dimensions of some features may be intentionally enlarged or reduced.

DETAILED DESCRIPTION OF THE EMBODIMENTS

Figure 1:
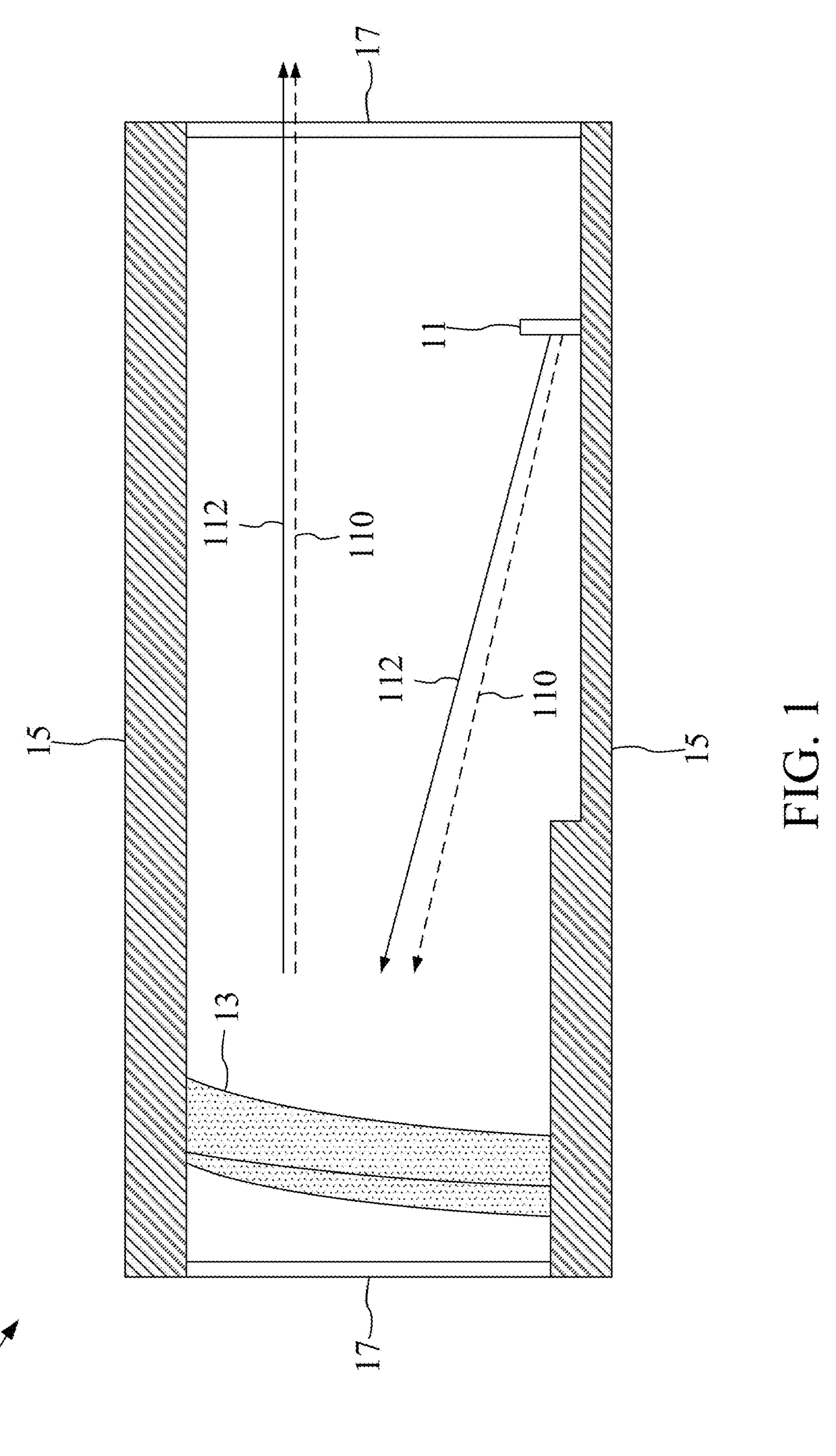
FIG. 1 is a schematic diagram of an aiming equipment 1 according to an embodiment of the present disclosure.

Numerous different embodiments or examples are provided in the present disclosure below to implement different features of the present application. Specific examples of elements and configurations are as described below for the purpose of simplifying the disclosure of the present application. However, these examples are merely illustrative of and are not restrictive of the present application. For example, a first feature formed on, over or above a second feature can include an embodiment in which the first and second features are in direct contact with each other, and can also include an embodiment in which another feature is formed between the first and second features and the first and second features are thus not in direct contact with each other. Moreover, numerals, symbols and/or letters may be repeated in different examples of the present application. Such repetition is for the purpose of simplicity and clarity, and does not dictate relations between the various embodiments and/or structures discussed.

In addition, terms of spatial correspondence used in the present application such as “under”, “lower than”, “below”, “more than”, “higher than” and the like can be used for simple description so as to explain a relation of one element or feature in a drawing with respect to another element or feature. In addition to orientations illustrated in the drawings, these terms of spatial correspondence further include different orientations of an apparatus in use or in operation. An apparatus can be oriented (rotated by 90 degrees or other orientations), and the spatial correspondence description used in the present application can be interpreted accordingly.

Despite that numeric ranges and parameters disclosed in the broadest range of the present disclosure are approximate values, the values stated in specific embodiments are as accurate as possible. However, any numeral intrinsically includes a certain error caused by a standard deviation obtained from individual testing and measurement. Moreover, as described herein, the term “about/approximate” usually refers to less than 10%, 5%, 1% or 0.5% of a predetermined value or range. Alternatively, the term “about/approximate” refers to within an acceptable standard error of a mean value considered by a person of ordinary skill in the art. Apart from operation/working examples, unless otherwise specified, it is to be understood that the amount, period of time, temperature, operating conditions, ratio of quantity of materials, as well as all numerical ranges, quantities, values and ratios of the like, are to be modified by the term “about/approximate” in all circumstances. Thus, unless described otherwise, the numerical values and parameters of the claims set forth in the present disclosure can be regarded as approximate values that are variable as needed. Each numerical value or parameter is interpreted at least in light of a quantity of effective numbers reported and by applying common rounding techniques. In the present disclosure, a range can represent from one endpoint to the other endpoint, or between these two endpoints. Unless otherwise specified, all ranges disclosed herein include endpoints.

FIG. 1 shows a schematic diagram of an aiming equipment 1 according to an embodiment of the present disclosure. The aiming equipment 1 includes a light source module 11, a spectroscope module 13, a housing 15 and a protection lens 17. The light source module 11 and the spectroscope module 13 are disposed within the housing 15, and the spectroscope module 13 includes at least two lenses. The protection lens 17 is disposed at each of opposite ends of the housing 15 so as to protect the light source module 11 and the spectroscope module 13.

In some embodiments, the light source module 11 is operable to project a first light 110 (indicated by dotted lines) and a second light 112 (indicated by solid lines) having different wavelengths from the position of the light source module 11 onto the spectroscope module 13. In other words, the light source module 11 is operable to project the first light 110 and the second light 112 in different visible colors from the position of the light source module 11 onto the spectroscope module 13. Next, the first light 110 and the second light 112 are reflected by the spectroscope module 13, such that a user is enabled to view the first light 110 and the second light 112 reflected by the spectroscope module 13.

More specifically, when lights having different wavelengths are projected from the same position and are reflected by a common reflecting lens, parallax perceivable to a user viewing from different positions or angles is caused by the reflected lights owing to a color difference, further leading to a reduced aiming accuracy. Thus, in order to prevent the condition above when a user uses the aiming equipment 1 for lights having different wavelengths, the spectroscope module 13 of the present disclosure adopts a specially designed lens structure to reflect the first light 110 and the second light 112, so as to reduce or even eliminate the color difference between the first light 110 and the second light 112. Details are provided in the embodiments below to describe how the spectroscope module of the present disclosure reduces or even eliminates, by means of a structural design, the color difference generated by different lights from the same light emitting position after the lights are reflected.

The first light 110 (indicated by dotted lines) and the second light 112 having different wavelengths emitted by the light source module 11 according to an embodiment of the present disclosure can project different centering patterns onto the spectroscope module 13. A user can select centering patterns in different colors with respect to different application scenarios (for example, seasons). For example, when an application scenario is the summer during which the color of a forest is quite green, a user can select a red centering pattern so as to clearly identify a target in the forest. For example, when an application scenario is the fall during which the color of a forest appears orange, a user can select a green centering pattern so as to clearly identify a target in the forest. For another example, in other scenarios, a user can select to display both red and green centering patterns at the same time.

Figure 2:
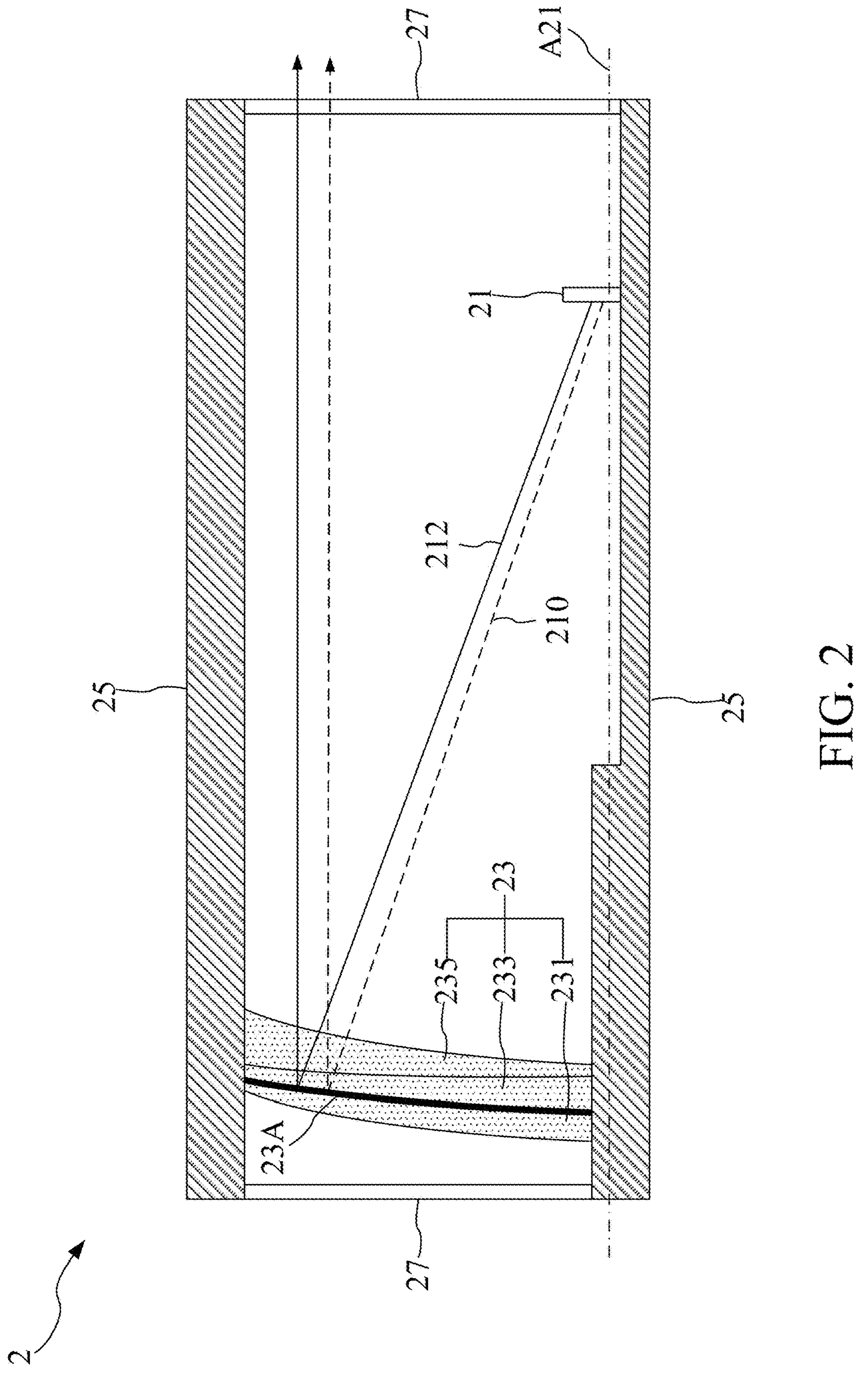
FIG. 2 is a schematic diagram of an aiming equipment 2 according to an embodiment of the present disclosure.

FIG. 2 shows a schematic diagram of an aiming equipment 2 according to an embodiment of the present disclosure. The aiming equipment 2 includes a light source module 21, a spectroscope module 23, a housing 25 and a protection lens 27. The light source module 21 and the spectroscope module 23 are disposed within the housing 25. The protection lens 27 is disposed at each of opposite ends of the housing 25 so as to protect the light source module 21 and the spectroscope module 23. In some embodiments, the protection lens 27 is a common transparent lens without a focusing function.

In some embodiments, the spectroscope module 23 includes a first lens 231, a second lens 233 and a third lens 235. More specifically, the first lens 231, the second lens 233 and the third lens 235 are disposed in an adjacent manner by means of bonding (for example, by gluing), and the second lens 233 is disposed between the first lens 231 and the third lens 235. In the aiming equipment 2, the third lens 235 of the spectroscope module 23 faces the light source module 21; in other words, a distance of the third lens 235 of the spectroscope module 23 from the light source module 21 is the shortest. The second lens 233 has a reflecting film 23A on one surface adjacent to the first lens 231. In some embodiments, the reflecting film 23A is transparent, and is operable to reflect a first light 210 and a second light 212.

In some embodiments, the light source module 21 is operable to project the first light 210 (indicated by dotted lines) and the second light 212 (indicated by solid lines) having different wavelengths from the position of the light source module 21 onto the spectroscope module 23, and the first light 210 and the second light 212 are then reflected by the reflecting film 23A of the spectroscope module 23, such that a user is enabled to view the first light 210 and the second light 212 reflected by the spectroscope module 23. For example, the light source module 21 is operable to project a green light 210 and a red light 212 from the position of the light source module 21 onto the spectroscope module 23, and the green light 210 and the red light 212 are then reflected by the reflecting film 23A of the spectroscope module 23, such that a user is enabled to view the green light 210 and the red light 212 reflected by the spectroscope module 23.

In some embodiments, when the first light 210 and the second light 212 are reflected, in order to reduce or even eliminate a color difference between the first light 210 and the second light 212, the aiming equipment 2 of the present disclosure has the following structural features: (1) the second lens 233 is a positive lens and the third lens 235 is a negative lens; (2) the refractive index of the second lens 233 is less than the refractive index of the third lens 235, and the Abbe number of the second lens 233 is greater than the Abbe number of the third lens 235 (for example, the material of the second lens 233 includes crown glass, and the material of the third lens 235 includes flint glass); (3) among structural parameters of the second lens 233, the focus needs to align with the light source module 21 (that is, the light source module 21 is located within the focus of the second lens 233); (4) among structural parameters of the third lens 235, the focus needs to align with the light source module 21 (that is, the light source module 21 is located within the focus of the third lens 235); and (5) the light source module 21 is located on a main optical axis A21 of the spectroscope module 23. As such, the first light 210 and the second light 212 having been reflected by the spectroscope module 23 can be emitted in parallel, and the color difference between the first light 210 and the second light 212 can be significantly reduced or even eliminated.

In some embodiments, regarding point (2) above, the refractive index of the second lens 233 can be adjusted to be greater than the refractive index of the third lens 235 and the Abbe number of the second lens 233 can be adjusted to be less than the Abbe number of the third lens 235 as needed, and the same functions can still be achieved.

In some embodiments, the first lens 231 is operable to adjust an overall thickness of the spectroscope module 23 so that the spectroscope module 23 has a uniform thickness. Thus, when a user observes a target (not shown) through the spectroscope module 23, the target does not become enlarged or reduced due to the spectroscope module 23.

Figure 3:
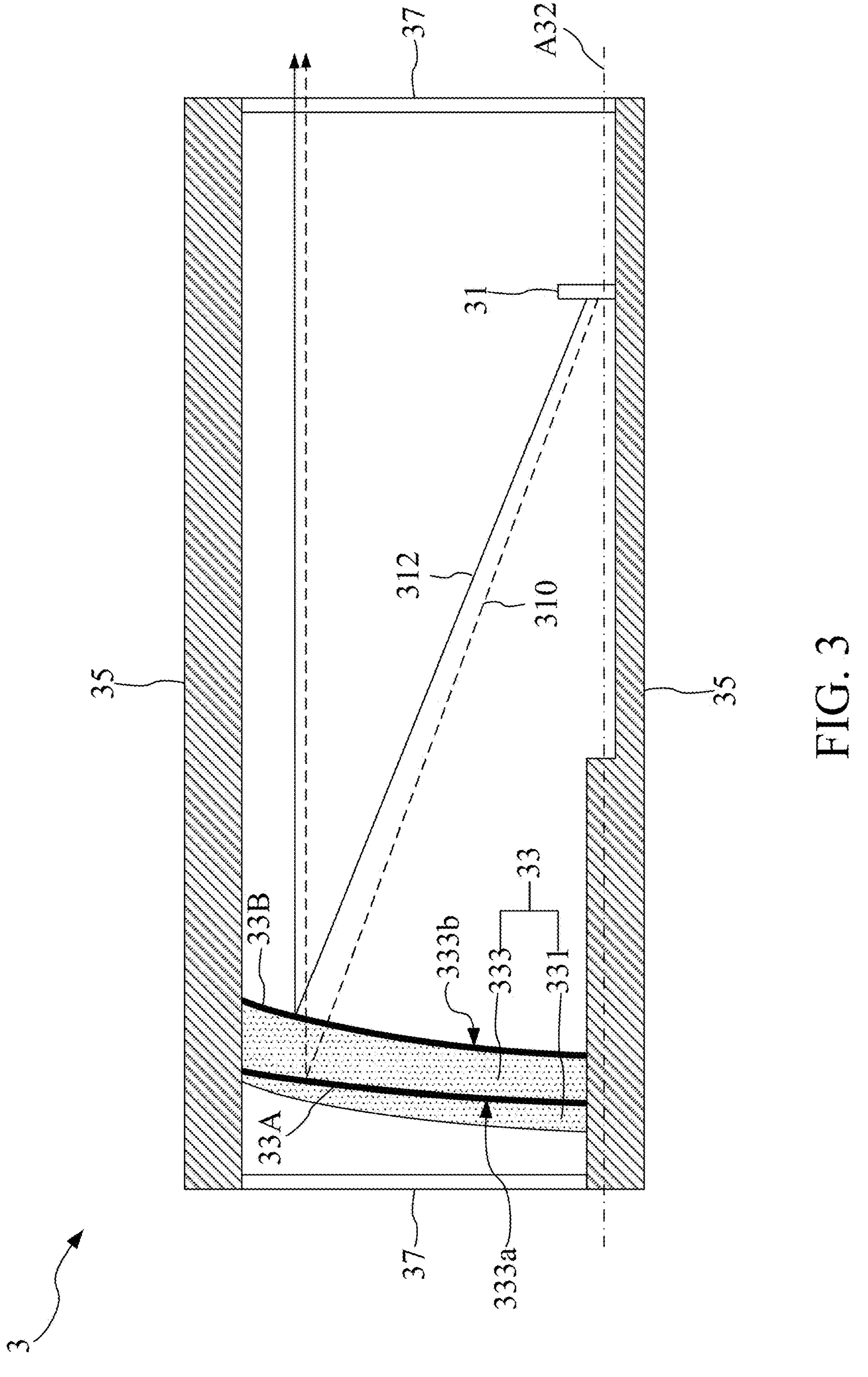
FIG. 3 is a schematic diagram of an aiming equipment 3 according to an embodiment of the present disclosure.

FIG. 3 shows a schematic diagram of an aiming equipment 3 according to an embodiment of the present disclosure. The aiming equipment 3 includes a light source module 31, a spectroscope module 33, a housing 35 and a protection lens 37. The light source module 31 and the spectroscope module 33 are disposed within the housing 35. The protection lens 37 is disposed at each of opposite ends of the housing 35 so as to protect the light source module 31 and the spectroscope module 33. In some embodiments, the protection lens 37 is a common transparent lens.

In some embodiments, the spectroscope module 33 includes a first lens 331 and a second lens 333. More specifically, the first lens 331 and the second lens 333 are disposed in an adjacent manner by means of bonding (for example, by gluing). In the aiming equipment 3, the second lens 333 of the spectroscope module 33 faces the light source module 31; in other words, a distance of the second lens 333 of the spectroscope module 33 from the light source module 31 is the shortest. The second lens 333 has a first surface 333*a* and a second surface 333*b*. The first surface 333*a* has a reflecting film 33A thereon, and the second surface 333*b* has a reflecting film 33B thereon. The reflecting film 33A and the reflecting film 33B are operable to reflect lights having different wavelengths, respectively.

In some embodiments, the light source module 31 is operable to project a first light 310 (indicated by dotted lines) and a second light 320 (indicated by solid lines) having different wavelengths from the position of the light source module 31 onto the spectroscope module 33. Next, the first light 310 is reflected by the reflecting film 33A of the spectroscope module 33, and the second light 312 is reflected by the reflecting film 33B of the spectroscope module 33, so that a user is enabled to observe the first light 310 and the second light 312 reflected by the spectroscope module 33.

In some embodiments, when the first light 310 and the second light 312 are reflected, in order to reduce or even eliminate a color difference between the first light 310 and the second light 312, the aiming equipment 3 of the present disclosure has the following structural features: (1) the second lens 333 is a negative lens; (2) the second surface 333*b* is an arc surface and the light source module 31 is located at a midpoint between an arc center 333C of the second surface 333*b* and the second surface 333*b* (that is, the light source module 31 is located at one-half of a distance between the arc center 333C of the second surface 333*b* and the second surface 333*b*); and (3) the light source module 31 is located on a main optical axis A31 of the spectroscope module 33. As such, the first light 310 and the second light 312 having been reflected by the spectroscope module 33 can be emitted in parallel, and the color difference between the first light 310 and the second light 312 can be significantly reduced or even eliminated.

In some embodiments, the first lens 331 is operable to adjust an overall thickness of the spectroscope module 33 so that the spectroscope module 33 has a uniform thickness. Thus, when a user observes a target (not shown) through the spectroscope module 33, the target does not become enlarged or reduced due to the spectroscope module 33.

In some embodiments, a degree of eliminating the color difference between the first light 310 and the second light 312 can be modified by adjusting structural parameters of the spectroscope module 33. More specifically, the structural parameters of the second lens 333 of the spectroscope module 33: (1) the radius of curvature of the second surface 333*b* is $r_1$; (2) the radius of curvature of the first surface 333*a* is $r_2$; (3) the refractive index of the material of the second lens 333 is n; and (4) the focal power of the second lens 333 is q. The structural parameters have the relationship below:

$$\varphi=\left[1-\frac{(1-n)d}{nr_1}\right]*\left[\frac{(1-n)}{r_1}+\frac{2n}{r_2}-\frac{2d(1-n)}{r_1r_2}\right]+\frac{1-n}{r_1}$$

When a horizontal distance d from the light source module 31 to the second lens 333 is constant, the radius $r_1$ of curvature of the second surface 333*b* of the second lens 333 is determined by the horizontal distance d from the light source module 31 to the second lens 333, that is: $r_1=2\times d$.

Meanwhile, the back intercept of the second lens 333 for the wavelength of reflected light by the first surface 333*a* is $l'_F=d$, which is $$l'_F=\frac{1}{\varphi}\left(1-\frac{(n-1)d}{nr_1}\right).$$

Moreover, according to a related Schott formula (the Schott formula), the formula of the refractive index n and the wavelength of a glass material is $n^2=a_0+a_1\lambda^2+a_2\lambda^{-2}+a_3\lambda^{-4}+a_4\lambda^{-6}+a_5\lambda^{-8}$. In the above, $a_0$, $a_1$, $a_2$, $a_3$, $a_4$, $a_5$ are constant coefficients and are determined by the glass material, and $\lambda$ is the wavelength.

It can be understood from the formula and the structural parameters above that, given the reflected wavelengths, materials and light source operating distance (that is, the horizontal distance d from the light source module 31 to the second lens 333) of the first surface 333*a* and the second surface 333*b*, default values of $r_1$ and $r_2$ can be calculated. In sum, the refractive index decreases as the wavelength increases, and when other conditions are kept unchanged, the radius $r_2$ of curvature decreases as the wavelength of the light reflected by the first surface 333*a* increases.

According to the present disclosure, the spectroscope module of the aiming equipment is capable of simultaneously reflecting lights having different wavelengths, and reducing or even eliminating a color difference caused by reflected lights having different wavelengths, hence preventing possible parallax perceivable to a user viewing from different positions, thereby significantly enhancing the accuracy.

Although the present disclosure and the advantages thereof are described as above, it is to be understood by a person skilled in the art that various modifications, replacements and substitutions can be made to the present disclosure without departing from the concept and scope defined by the appended claims of the present disclosure. For example, the processes above can be implemented by different means, and can be replaced by any other processes or combinations thereof.

The scope of the present disclosure is not limited to the specific embodiments of the processes, machinery, manufacturing, substance compositions, apparatuses, methods or steps described herein. A person skilled in the art would be able to understand from the disclosed details of the present disclosure that any existing or potential processes, machinery, manufacturing, substance compositions, apparatuses, methods or steps can be used to implement the details of the present disclosure. These processes, machinery, manufacturing, substance compositions, apparatuses, methods or steps have the same functions or achieve substantially the same results as disclosed in the specific embodiments above. Accordingly, these processes, machinery, manufacturing, substance compositions, apparatuses, methods and steps are all encompassed within the scope of the appended claims of the present disclosure.

What is claimed is:

1. An aiming equipment, comprising:

a light source module, configured to project a first light and a second light, wherein the first light and the second light have different wavelengths; and a spectroscope module, comprising at least two lenses to reflect the first light and the second light and reduce a color difference between the first light and the second light, wherein the at least two lenses comprise a first lens, a second lens and a third lens, the second lens is disposed between the first lens and the third lens, the third lens faces the light source module, the second lens has a reflecting film on a surface adjacent to the first lens, and the reflecting film is used to reflect the first light and the second light.

2. The aiming equipment according to claim 1, wherein the spectroscope module has a uniform thickness.

3. The aiming equipment according to claim 1, wherein the second lens is a positive lens and the third lens is a negative lens.

4. The aiming equipment according to claim 3, wherein an Abbe number of the second lens is greater than an Abbe number of the third lens when a refractive index of the second lens is less than the refractive index of the third lens, and the Abbe number of the second lens is less than the Abbe number of the third lens when the refractive index of the second lens is greater than the refractive index of the third lens.

5. The aiming equipment according to claim 4, wherein the light source module is disposed on a focus of the second lens and the third lens.

6. The aiming equipment according to claim 1, wherein the light source module is disposed on a main optical axis of the spectroscope module.

7. A spectroscope module for an aiming equipment, comprising:

a first lens;

a second lens; and a third lens;

wherein the second lens is disposed between the first lens and the third lens, the third lens faces a light source module of the aiming equipment, the second lens has a reflecting film on a surface adjacent to the first lens, and the reflecting film is used to reflect a first light and a second light projected by the light source module.

8. The spectroscope module according to claim 7, wherein the spectroscope module has a uniform thickness.

9. The spectroscope module according to claim 7, wherein the second lens is a positive lens and the third lens is a negative lens.

10. The spectroscope module according to claim 9, wherein an Abbe number of the second lens is greater than an Abbe number of the third lens when a refractive index of the second lens is less than the refractive index of the third lens, and the Abbe number of the second lens is less than the Abbe number of the third lens when the refractive index of the second lens is greater than the refractive index of the third lens.

11. The spectroscope module according to claim 7, wherein a focus of the second lens aligns with the light source module.

12. The spectroscope module according to claim 7, wherein a focus of the third lens aligns with the light source module.

* * * * *